Aug. 2, 1949.  A. G. PINCUS  2,477,649
GLASS COMPOSITION

Filed Aug. 16, 1944  5 Sheets-Sheet 2

INVENTOR
ALEXIS G. PINCUS
BY
Louis L. Gagnon
ATTORNEY

Aug. 2, 1949.   A. G. PINCUS   2,477,649
GLASS COMPOSITION
Filed Aug. 16, 1944   5 Sheets-Sheet 3

Fig. 3

INVENTOR
ALEXIS G. PINCUS
BY
Louis L. Gagnon
ATTORNEY

Aug. 2, 1949.    A. G. PINCUS    2,477,649
GLASS COMPOSITION

Filed Aug. 16, 1944    5 Sheets-Sheet 4

Fig. 4

INVENTOR
ALEXIS G. PINCUS
BY Louis L. Gagnon
ATTORNEY

Aug. 2, 1949.        A. G. PINCUS        2,477,649
                    GLASS COMPOSITION
Filed Aug. 16, 1944                    5 Sheets-Sheet 5

INVENTOR
ALEXIS G. PINCUS
BY
Louis L. Gagnon
ATTORNEY

Patented Aug. 2, 1949

2,477,649

UNITED STATES PATENT OFFICE 2,477,649

GLASS COMPOSITION

Alexis G. Pincus, Southbridge, Mass., assignor to American Optical Company, Southbridge, Mass., a voluntary association of Massachusetts Application August 16, 1944, Serial No. 549,652

14 Claims. (Cl. 106—47)

1

This invention relates to novel glass compositions and method of making the same and to articles of said compositions.

One of the principal objects of the invention is to provide a glass composition whose chemical analysis embodies predominantly oxides of a metal selected from the group consisting of zinc, lead, cadmium and bismuth combined with an oxide having a polyvalent cation in its structure and boric oxide and method of making the same.

Another object is to provide a glass composition embodying the above ingredients and containing other modifying ingredients.

Another object is to provide a novel method of controlling, with glass compositions of the above nature, the resultant index of refraction and reciprocal relative dispersion.

Another object is to provide in a glass composition which predominantly consists of oxides of a metal such as zinc, lead, bismuth or cadmium and boric oxide means for rendering said glass compositions more resistant to water solubility, for increasing the working range and improving the homogeneity of the melt during the fabrication of the glass and the optical quality of the resulting glass article and at the same time widening the range of compositions forming glass so that higher refractive indices become practical.

Another object of the invention is to provide a zinc borate glass containing phosphoric oxide and method of making the same.

Another object is to provide a cadmium borate glass containing phosphoric oxide and method of making the same.

Another object is to provide a lead borate glass containing phosphoric oxide and method of making the same.

Another object is to provide a bismuth borate glass containing phosphoric oxide and method of making the same.

Another object is to provide glass compositions containing two or more oxides selected from the group comprising zinc, cadmium, lead, and bismuth and containing boric oxide and oxide having a polyvalent cation in its structure with or without the addition of other selected ingredients depending upon the characteristics desired of the glass.

Another object is to provide a transparent homogeneous glass suitable for use in forming optical elements or other vitreous articles resulting from the combining by fusion of zinc oxide, boric oxide and phosphoric oxide with or without the addition of other selected ingredients depending upon the characteristics desired of the glass.

2

Another object is to provide a borate glass containing phosphoric oxide as a stabilizer, flux, vitrifying agent and homogenizing agent and which makes possible the forming of such glasses with higher refractive indices than have hitherto been possible for this type of glass while retaining homogeneity.

Another object is to provide glasses of the above character having relatively high indices of refraction and a high reciprocal relative dispersion for such indices as compared with known commercial glasses of reasonable cost.

Other objects and advantages of the invention will become apparent from the following description and it will be seen that many changes may be made in the arrangements of ingredients and methods described without departing from the spirit of the invention as expressed in the accompanying claims. I, therefore, do not wish to be limited to the exact details and methods described, as the preferred forms only have been set forth by way of illustration.

In the design of optical instruments the extension of the range of indices of refraction and relative reciprocal dispersion is of great value to the optical designer. Improvements in optical designs have reached the point where they depend on new and improved optical glasses in order to improve optical instruments. The increase of refractive index with relatively high Nu values permits flattening the fields in the third order terms of approximation and helps elimination of the higher order of aberrations of all types. It is of extreme importance that such advantages may be obtained without resorting to glasses which contain very rare and expensive ingredients. Notwithstanding the high index of refraction of the glasses of the present invention they are more transparent as to ultra-violet rays than glasses of ordinary borosilicate crown type. This distinguishes from the prior art glasses which absorb ultra violet rays increasingly as the index of refraction increases. This improved ultra-violet transmission permits lens systems to be designed so that they will function in the ultra-violet. This is especially advantageous because the separation of two objects which can be resolved by a microscope is directly proportional to the wave length, other things being constant. In addition, to the above the said glasses are particularly desirable in that they are relatively inexpensive as compared with prior art high index-low dispersion glasses because they are formed from inexpensive and plentiful materials.

Referring more particularly to the drawings.

In the figures dots within the circle as shown at 7 indicate transparent glasses and the numbers 8 above said symbol indicate the index of refraction of said particular composition and the numbers 9 below said symbols indicate the reciprocal relative dispersion. These values are given by way of a rough indication of the optical properties obtainable because it is now well known in the art that refractive index is affected by heat treatment and each individual composition when completely compacted by the most favorable annealing schedule would increase to a maximum refractive index. The values given, however, are the approximate indices of refraction and Nu values of said compositions as measured on samples prepared on an experimental scale in the laboratory and approximate the final values.

One of the outstanding features of the present invention as discovered by applicant is that the addition of $P_2O_5$ to a borate glass produces the unexpected result of forming a homogeneous transparent structure, with the $P_2O_5$ functioning to improve the optical homogeneity, the vitrification and working properties, and the chemical durability. By this is meant that in the preferred composition ranges these glasses containing $P_2O_5$ are much less likely to form crystals on cooling, have better working ranges at more favorable temperatures and the resultant glasses are much less subject to striae, ream, bubbles, seed and other defects which it is always the object of the optical glass maker to avoid to a very high degree of perfection. As to chemical durability, all of these $P_2O_5$-containing borate type glasses have extraordinarily low solubility in water—much better than that of present crown, flint or barium glasses and approaching that of chemical laboratory resistant borosilicate glasses.

One composition embodying the invention comprises preferably the following ingredients:

| | Parts by weight |
|---|---|
| ZnO (zinc oxide) | Approximately 50 to 70 |
| $B_2O_3$ (boric oxide) | Approximately 50 to 15 |
| $P_2O_5$ (phosphoric oxide) | Approximately 1 to 20 |

A particular composition which has proven satisfactory is as follows:

| | Parts by weight |
|---|---|
| ZnO (zinc oxide) | Approximately 65 |
| $B_2O_3$ (boric oxide) | Approximately 30 |
| $P_2O_5$ (phosphoric oxide) | Approximately 5 |

This composition yields a glass which is very transparent and homogeneous, stable and colorless, having an index of refraction of approximately 1.668 and a reciprocal relative dispersion of approximately 49. By using pure raw materials, the ultra-violet transmission can be extended to less than 240 millimicrons at 2.0 mm. thickness. This glass has remarkably low solubility in water of about 0.6% as determined by an established test procedure. This value may be compared with those found for present commercial glasses of 4 to 6% for an ordinary crown and 4% for a barium flint of corresponding refractive index.

Another desirable composition may be formed as follows:

| | Parts by weight |
|---|---|
| ZnO (zinc oxide) | Approximately 70 |
| $B_2O_3$ (boric oxide) | Approximately 15 |
| $P_2O_5$ (phosphoric oxide) | Approximately 15 |

This glass has the unusually high refractive index for zinc borate glasses of 1.682 and a favorable reciprocal relative dispersion of approximately 48. It can be seen that by an increase of 5% in zinc oxide content the refractive index is raised 0.014. This high zinc oxide level would not have been practical except for the vitrifying effect of the phosphoric oxide.

Figure 1:
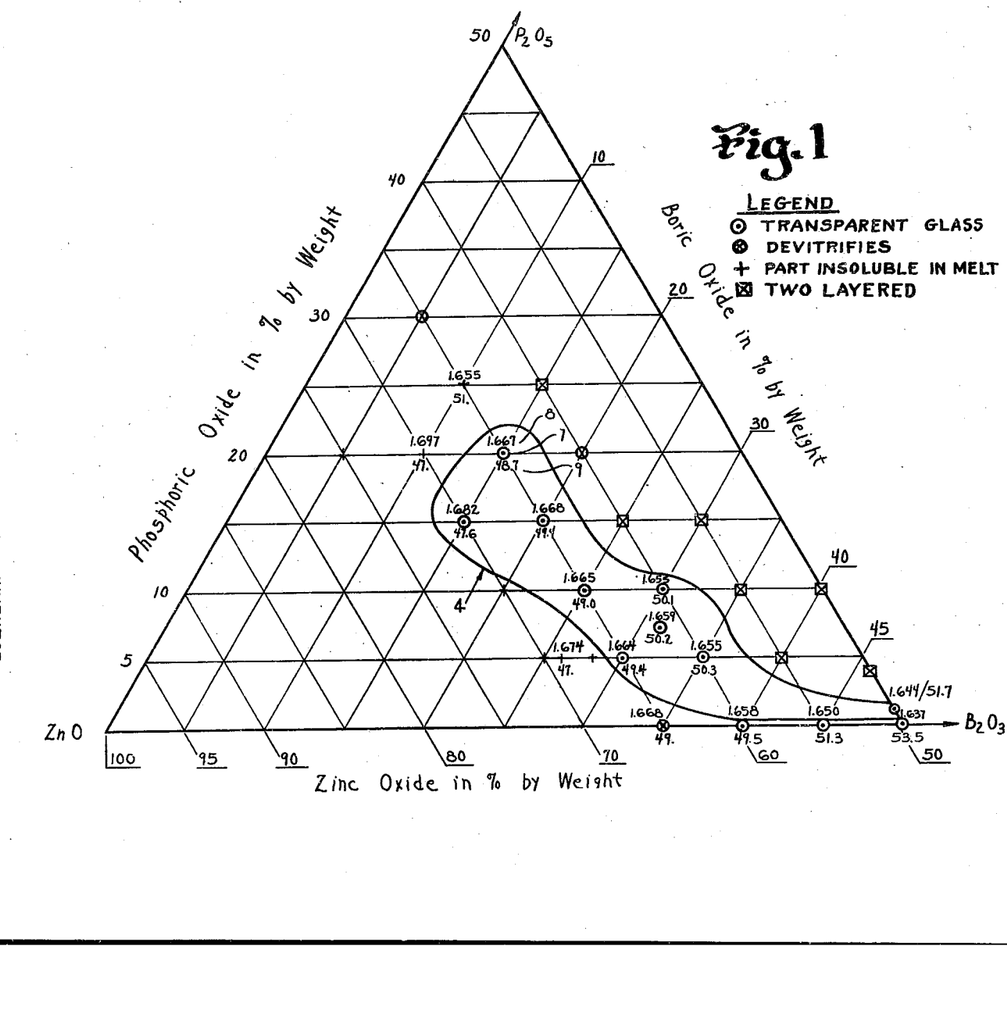
Fig. 1 is a triangular co-ordinate diagram of the major ingredients used showing the relative proportion of each which can be embodied to yield transparent glasses.

Fig. 1 shows the factors which limit the meltability and which have led to the selection of certain limited proportions. If $B_2O_3$ becomes too high, the liquid during melting separates into two liquid layers and such compositions obviously are useless for producing optical homogeneous glasses. If ZnO becomes too high, the liquid forms crystals on lowering to working temperatures and eventually devitrifies completely. If $P_2O_5$ is too low, the maximum usable content of zinc oxide is lowered by devitrification. If $P_2O_5$ is too high, the melt will devitrify before it reaches temperatures low enough to permit working. Only within the limited range indicated by 4 of Fig. 1 can the liquid be easily maintained homogeneous throughout the melting and working ranges and desirable transparent optical glasses be obtained.

By referring to Fig. 1 and to the outlined area 4 thereof it will be seen that $P_2O_5$ additions skew the area forming transparent glasses so that at higher $P_2O_5$ contents maximum ZnO content is practical whereas if a minimum ZnO content is desired $P_2O_5$ must be kept low, around one part by weight at fifty parts ZnO with the balance being boric oxide. This choice is useful because it makes possible a variation in refractive index over a range from 1.64 to almost 1.70.

From the refractive index values 8 indicated next to the corresponding compositions in Fig. 1, it is obvious that the zinc oxide content is the controlling factor in determining the refractive index. Substitution of phosphoric oxide for boric oxide does not appreciably change the optical properties.

If desired $Al_2O_3$ (aluminum oxide) or BeO (beryllium oxide) either separately or both together may be added, depending upon the resultant characteristics desired.

The alumina may be added to these batches in the form of the oxide or hydroxides, or as the metaphosphate or orthophosphate of aluminum whichever is preferred for the properties sought.

The amount of alumina or beryllia to be added is determined by the percentage of zinc oxide. For example, at 65% zinc oxide and 5% phosphoric oxide, not even 1% of alumina can be introduced without causing precipitation in the melt. At 60% ZnO and 5% $P_2O_5$, the addition of alumina or beryllia is a definite advantage for inhibiting devitrification. For example, the composition 60% ZnO, 35% $B_2O_3$ and 5% $P_2O_5$ formed a surface scum of hexagonal crystals when held at 1600° F. for a period of several hours, but the composition 60% ZnO, 31% $B_2O_3$, 5% $P_2O_5$, 3% $Al_2O_3$ and 1% BeO could be held at that temperature indefinitely without devitrification.

Figure 2:
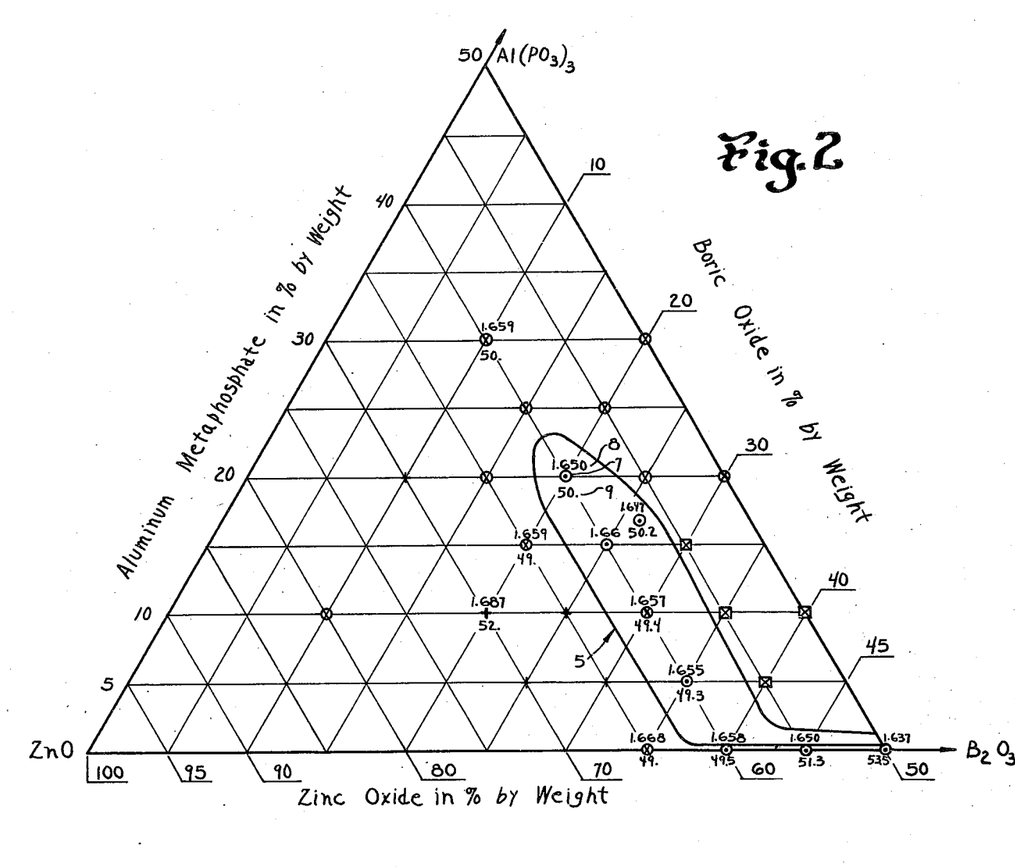
Fig. 2 is a similar diagram which shows the melting behavior of batches made up of three components, zinc oxide, boric oxide and aluminum metaphosphate, in which phosphoric oxide, therefore, has a fixed weight ratio to aluminum oxide of four parts to one.

Fig. 2 sets out the limiting factors in the obtaining of transparent glasses from four component glasses made up of zinc oxide, boric oxide, phosphoric oxide and aluminum oxide in the fixed ratio established by aluminum metaphosphate. Likewise on the figures there are indicated the refractive index 8 and Nu 9 values for the resulting transparent glasses and like in Fig. 1 the dots within the circle 7 indicate the most practical compositions. From this figure it can be seen that such additions have no advantage at 65% zinc oxide or higher, but at 60% zinc oxide they do help the working properties of the glass by lowering the liquidus temperature and thus retarding devitrification in the working range.

Figure 3:
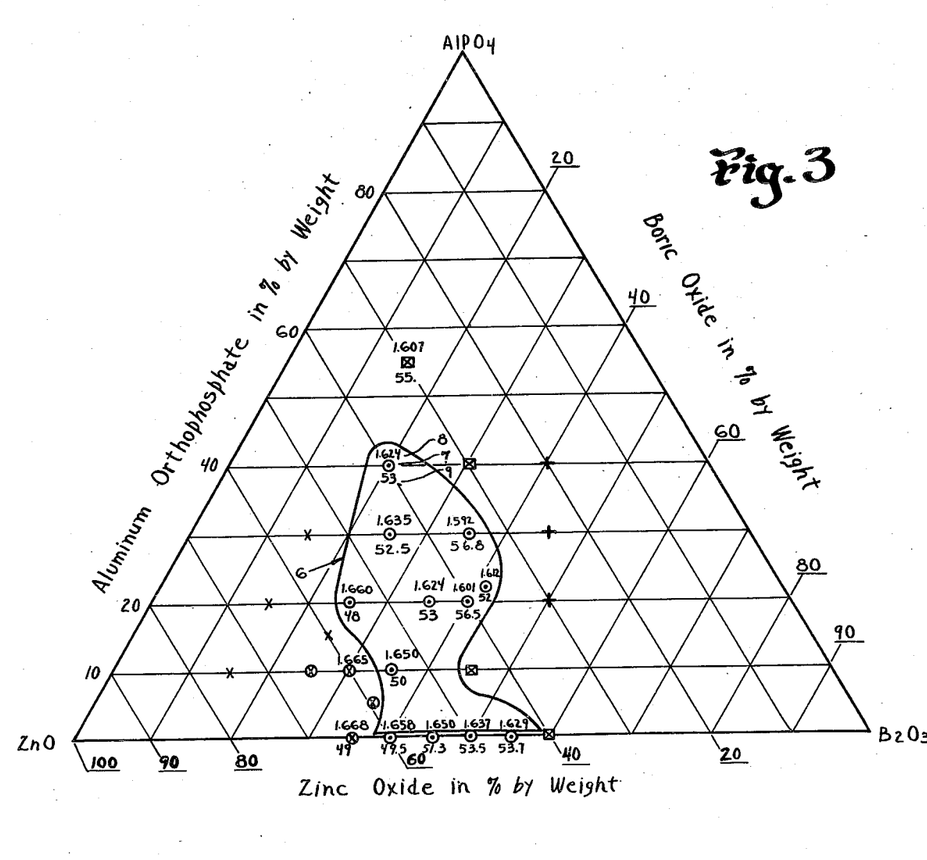
Fig. 3 is a similar plot in which aluminum orthophosphate is the third component and is the only source of phosphoric oxide and aluminum oxide. Therefore, the phosphoric oxide has the weight ratio to aluminum oxide of about one and one-half to one.

Fig. 3 discloses the glasses which may be formed by blending the three components: zinc oxide, boric oxide and aluminum orthophosphate, and also indicates the compositions which cannot easily be obtained as transparent glasses because of high melting temperatures, devitrification, insolubility of some of the constituents in the melt or separation into two liquid layers. Within the field 6 of transparent homogeneous glasses of Fig. 3, aluminum orthophosphate additions to zinc borates make possible a very wide range of zinc oxide content and consequently a wider range of indices than within the limited field 4 of Fig. 1. These aluminum orthophosphate glasses are characterized by excellent hardness and chemical durability and it is notable that they permit the introduction, in practical commercial compositions, of an unusually high $Al_2O_3$ content of about 16%. The range of refractive indices made possible by these aluminum orthophosphate-zinc oxide-boric oxide formulas varies from 1.59 to 1.66 with corresponding Nu values of 57 to 48 respectively. In Fig. 3, like the above Figs. 1 and 2, the dots within the circle 7 indicate the preferred compositions for obtaining desirable commercial optical glasses and the particular locations of the dots within the circles indicate different glass compositions by utilizing the commonly known interpretations of such triaxial diagrams.

The net result of adding alumina is to shift glass-forming fields to lower zinc oxide contents thereby producing a lowering of the maximum attainable refractive index. In many cases this is undesirable as the highest possible refractive index is preferred, but in certain cases lower refractive index may be desirable for some specific lens design problems.

The preferred embodiment of the invention, therefore, as set forth above does not require the use of beryllia or alumina and more particularly beryllia as this greatly adds to the cost of the glass.

It is to be understood that either the alumina or the beryllia may be used separately or that a mixture thereof may be used as each performs the same function of improving the chemical durability and working property of specific proportions. This result may be brought about even though alumina and beryllia are not chemically equivalent as far as valences go. They are functionally equivalent in their behavior in glass compositions such as disclosed.

Besides the three or four ingredients which are mentioned other modifying ingredients can be included for specific purposes, such as (1) the coloring agents known in the art for producing colored glasses; for example, cobalt, nickel, iron, cerium; or (2) minor so-called stabilizing ingredients such as titania zirconia and other well known in the art. So-called "fining agents" which are essential in the usual glasses, even though present in very small amounts, such as arsenic, antimony, nitrates, sulphates are not essential in these glasses because they are inherently free from bubbles and striae and are unusually colorless even without the use of specially pure raw materials, but may be used if desired.

It is to be understood that any of the compositions given within the outlined areas are practical for use. The compositions on either side of the boundary lines particularly those just outside the boundaries may be obtained as a transparent homogeneous glass by sufficiently rapidly cooling, but the areas selected include those compositions most practical on a commercial scale with the slower cooling essential for larger production masses of glass. It is apparent, therefore, that some of the glass compositions just outside of the areas might be practical for use if cooled more quickly than usual from above the liquidus temperature at which crystallization begins to take place. It is to be understood, therefore, that applicant does not desire to limit the invention to just those melts within the most practical ranges but has made a discovery that $P_2O_5$ greatly aids in maintaining vitrification in borate melts within practical commercial controls.

The examples so far given and the dots within the circle configurations in the drawings represent the chemical analysis of the ultimate glasses. However, in the manufacture of glasses, a wide variety of materials is possible to produce any and all of the glasses indicated in the foregoing examples.

For example, zinc oxide may be derived from the oxide, carbonate, nitrate or other salt. Boric oxide may be derived from boric acid, fused anhydrous boric oxide, boron phosphate, etc. Phosphoric oxide may be derived from phosphoric anhydride, any one of the forms of phosphoric acid, zinc orthophosphate, zinc metaphosphate, boron phosphate, etc., depending on the convenience and economy of the raw materials selected.

The analyses given in the claims, therefore, are intended to cover all of such equivalent chemical explanations for materials which will yield the oxides sought upon fusion into a glass.

Let us assume that we desire to prepare a glass to have the final analysis 65% ZnO, 30% $B_2O_3$, 5% $P_2O_5$. The following raw materials are mixed in the relative weights indicated. 62.2 parts zinc oxide, 7.8 parts zinc metaphosphate and 53.3 parts boric acid. This thoroughly mixed batch is fed into a refractory container in a furnace at approximately 2200° F. and melts very quickly to a uniform liquid. After melting and gas evolution is complete, the furnace temperature is dropped to about 1600° F. and held there until any striae present in the liquid have been eliminated. As is customary in optical glass practice, the melt may be stirred at any or all of the steps from filling to pouring, but the glasses of the type herein described are unusual in giving an extraordinarily good optical quality even without stirring. The glass is then ready for working by any of the usual techniques employed in glass fabrication. For example, the most common process is to pour the melt at the reduced temperature onto a table and roll into sheet form. This sheet can then be placed in a furnace for annealing. With the glass of the example given the preferred annealing temperature would be approximately 950° F. This will relieve any mechanical strains present and the glass is then allowed to cool slowly to room temperature. A clear, transparent, homogeneous glass results highly suitable for use in optical systems. The glass can then be cut up into desirable sizes and weights depending upon the article to be formed, molded into a lens or prism blank and then fine annealed to achieve maximum homogeneity and maximum index. It is then ready to be fabricated into an optical component.

The foregoing sets forth one of the preferred embodiments of the invention.

Other oxides such as cadmium oxide (CdO), bismuth oxide ($Bi_2O_3$) and lead oxide (PbO) may be substituted for the zinc oxide or may be used one in combination with the other or all may be combined. This will be set forth hereinafter more in detail.

Figure 4:
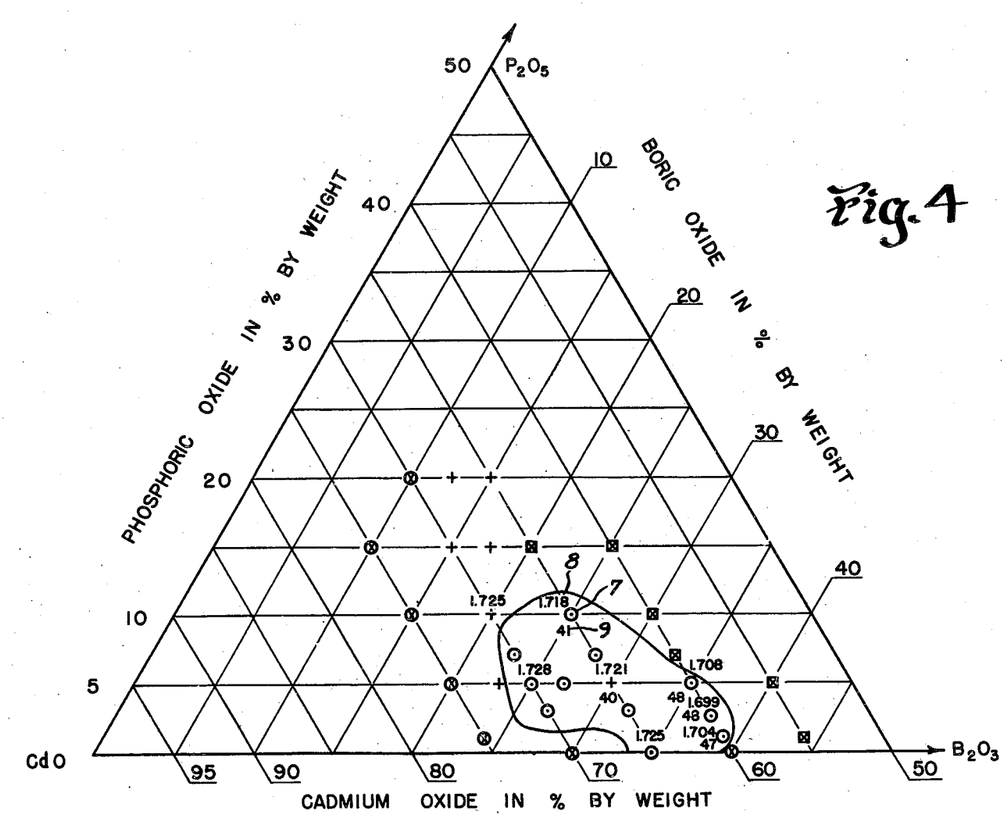
Fig. 4 is a diagram similar to Fig. 1 in which cadmium oxide replaces zinc oxide.

For example, as shown in the tri-axial diagram of Fig. 4, a very desirable glass composition may be formed as follows:

|  | Parts by weight |
|---|---|
| CdO (cadmium oxide) | Approximately 60 to 72 |
| $B_2O_3$ (boric oxide) | Approximately 18 to 35 |
| $P_2O_5$ (phosphoric oxide) | Approximately 1 to 10 |

A particular composition which has proven satisfactory is as follows:

|  | Parts by weight |
|---|---|
| CdO (cadmium oxide) | Approximately 70 |
| $B_2O_3$ (boric oxide) | Approximately 25 |
| $P_2O_5$ (phosphoric oxide) | Approximately 5 |

This composition yields a glass which is very transparent and homogeneous, stable and colorless, having an index of refraction of approximately 1.726 and a reciprocal relative dispersion of approximately 40. By using pure raw materials, the ultra-violet transmission can be extended to less than 280 millimicrons at 2.0 mm. thickness. This glass has remarkably low solubility in water of about 0.4% as determined by an established test procedure. This value may be compared with those found for present commercial glasses of 4 to 6% for a known crown and 4% for a barium flint.

Another desirable composition may be formed as follows:

|  | Parts by weight |
|---|---|
| CdO (cadmium oxide) | Approximately 60 |
| $B_2O_3$ (boric oxide) | Approximately 35 |
| $P_2O_5$ (phosphoric oxide) | Approximately 5 |

This glass has the high refractive index of 1.708 and a favorable reciprocal relative dispersion of 48.

If lead oxide (PbO) is substituted for zinc oxide (ZnO) or cadmium oxide (CdO), the glass composition will be substantially as follows:

|  | Parts by weight |
|---|---|
| PbO (lead oxide) | Approximately 50 to 90 |
| $B_2O_3$ (boric acid) | Approximately 50 to 10 |
| $P_2O_5$ (phosphoric oxide) | less than 1 to 10 |

A particular composition which has proven satisfactory is substantially as follows:

|  | Parts by weight |
|---|---|
| PbO (lead oxide) | Approximately 85 |
| $B_2O_3$ (boric oxide) | Approximately 14 |
| $P_2O_5$ (phosphoric oxide) | Approximately 1 |

Bismuth oxide ($Bi_2O_3$) is similar to lead oxide (PbO) in the proportion which is practical as well as in the resulting optical properties.

It has been stated above that zinc oxide (ZnO) may be replaced by cadmium oxide (CdO), lead oxide (PbO) or bismuth oxide $Bi_2O_3$. It is to be understood, however, that two or more of said ingredients may be combined with the total combined ingredients being substantially in the proportions given.

The purpose of combining two or more of said ingredients is to improve the working properties beyond that which can be obtained by the use of only one of said ingredients. Also the chemical durability may be improved and most important a control is offered over the variation of relative reciprocal dispersion for a given refractive index, that is, the relative reciprocal dispersion may be varied for a given index of refraction or conversely the refractive index may be varied for a given reciprocal dispersion. For example, it has been found that with the use of combined zinc and cadmium oxides the index of refraction may be varied from 1.66 up to 1.72 at a relative reciprocal dispersion of 49. At a refractive index of 1.69 the dispersion may be varied from approximately 35 up to about 50 with added lead oxide.

It has been found that alkaline earth oxides may also be included in these compositions, but in general their complete substitution for these oxides is not desirable because the resultant glasses are too soluble. However, the partial replacement of zinc oxide by these alkaline earth oxides such as barium (BaO), strontium (SrO), calcium (CaO), and magnesium (MgO) has certain advantages in further extending the control over the refractive index-dispersion relationships. Zinc oxide (ZnO) may be replaced by barium oxide (BaO) in the proportion of approximately 0 to 40 parts by weight. Zinc oxide (ZnO) may be replaced by strontium oxide (SrO) by approximately 0 to 40 parts by weight. Zinc oxide (ZnO) may be replaced by calcium oxide (CaO) by approximately 0 to 25 parts by weight and zinc oxide (ZnO) may be replaced by magnesium (MgO) by approximately 10 parts by weight or combinations of barium oxide (BaO), strontium oxide (SrO), calcium oxide (CaO), and magnesium oxide (MgO) may be used in combination with zinc oxide (ZnO) and its equivalents if desired.

It is to be noted that as the alkaline earth oxide decreases in molecular weight a smaller percentage of it can be introduced into the glass, the limiting factor being an increased tendency to devitrification.

It is particularly pointed out that in no instance is the zinc oxide group entirely replaced by alkaline earth oxides.

It has been found that a barium borate glass free from zinc oxide may be obtained as follows:

|  | Parts by weight |
|---|---|
| BaO (barium oxide) | Approximately 60 |
| $P_2O_5$ (phosphoric oxide) | Approximately 5 |
| $B_2O_3$ (boric oxide) | Approximately 35 | but is eighty-three per cent soluble in water by an established test procedure. Replacing only twenty per cent of the barium oxide by the zinc oxide leading to the formula:

| | Parts by weight |
|---|---|
| BaO (barium oxide) | Approximately 40 |
| ZnO (zinc oxide) | Approximately 20 |
| $P_2O_5$ (phosphoric oxide) | Approximately 5 |
| $B_2O_3$ (boric oxide) | Approximately 35 | reduces this solubility to eight tenths of one per cent and gives a glass with the desirable optical properties of refractive index of 1.65 and relative reciprocal dispersion of 51.

Other desirable compositions in which zinc oxide when combined with phosphoric oxide functions to reduce solubility of an alkaline earth borate glass is substantially as follows:

| | Parts by weight |
|---|---|
| ZnO (zinc oxide) | Approximately 5 to 60 |
| CaO (calcium oxide) | Approximately 5 to 25 |
| $B_2O_3$ (boric oxide) | Approximately 30 to 70 |
| $P_2O_5$ (phosphoric oxide) | Approximately 1 to 15 |

Specific formulas which have produced desired results are as follows in the high zinc oxide and low calcium oxide part of this range:

| | Parts by weight |
|---|---|
| ZnO (zinc oxide) | Approximately 60 |
| CaO (calcium oxide) | Approximately 5 |
| $B_2O_3$ (boric oxide) | Approximately 30 |
| $P_2O_5$ (phosphoric oxide) | Approximately 5 |

The resulting glass has desirable optical properties, refractive index of 1.67 and relative reciprocal dispersion of 52.

Blends having approximately equal parts of zinc oxide and calcium oxide have particularly high relative reciprocal dispersions and offer great promise for optical design. A specific example is:

| | Parts by weight |
|---|---|
| ZnO (zinc oxide) | Approximately 30 |
| CaO (calcium oxide) | Approximately 20 |
| $B_2O_3$ (boric oxide) | Approximately 45 |
| $P_2O_5$ (phosphoric oxide) | Approximately 5 |

This glass has a refractive index of 1.64 and a relative reciprocal dispersion of 56.

Phosphoric oxide ($P_2O_5$) produces very satisfactory results and is the preferred ingredient used in this respect. However, it has been found that other oxides having a polyvalent cation in their structure such as arsenic oxide ($As_2O_5$), antimony oxide ($Sb_2O_5$), tantalum oxide ($Ta_2O_5$), thorium oxide ($ThO_2$), and lanthanum oxide ($La_2O_3$) may replace phosphoric oxide partially or completely and they may be used independently or in combination with each other. That is, one of said oxides may be the only polyvalent oxide in the formula, or two or more may be used simultaneously. One reason why these are not as desirable as phosphoric oxide is that when they replace phosphoric oxide the maximum practical limit of zinc oxide is lower. In the examples given in Fig. 1 65% zinc oxide is practical at 5% $P_2O_5$ whereas if the above mentioned polyvalent oxides replace phosphoric oxide the practical limit drops to 60% and in some instances as low as 55% zinc oxide.

Figure 5:
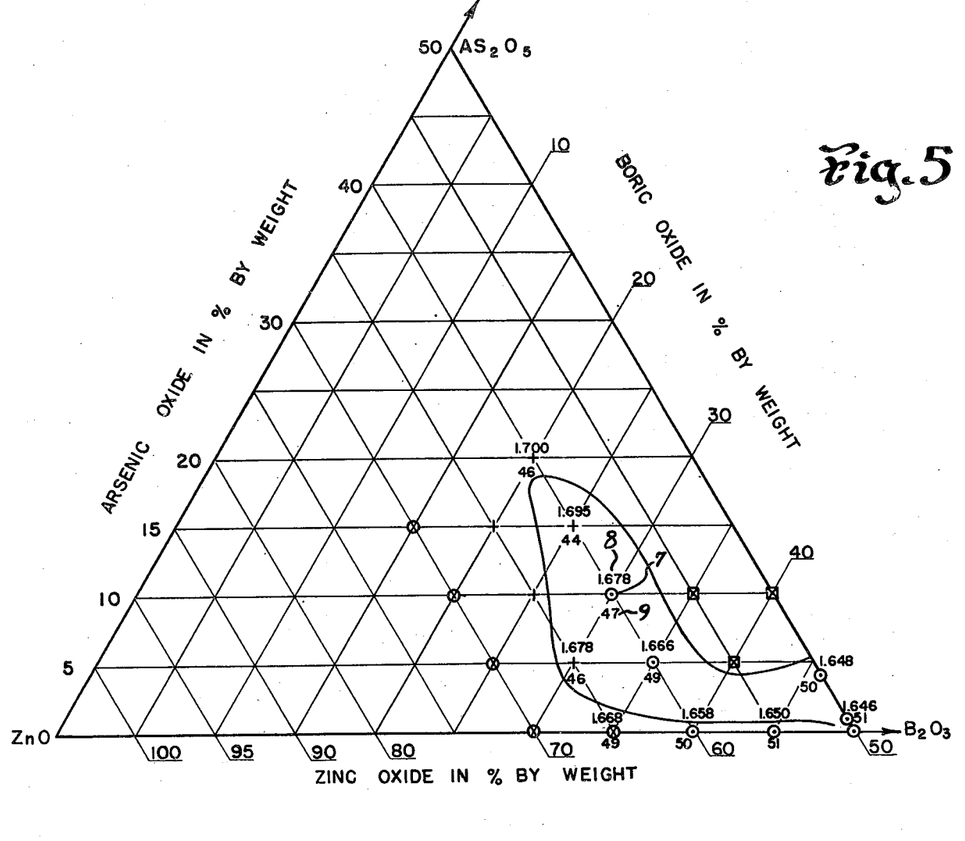
Fig. 5 is a view generally similar to Fig. 1 illustrating the use of arsenic oxide ($As_2O_5$) instead of phosphoric oxide ($P_2O_5$).

Fig. 5 illustrates the effects of one of these substitutions by a tri-axial diagram for the field zinc oxide-boric oxide-arsenic oxide. Similar tri-axial fields would result by the substitution of the other above mentioned oxides having a polyvalent cation in their structure and mentioned as possible replacements for the phosphoric oxide ($P_2O_5$).

Comparing Fig. 5 to Fig. 1 it will be seen that the replacement of phosphoric oxide by arsenic oxide permits glass formation over a similar range but more limited in extent. For example, the composition zinc oxide 60% by weight, boric oxide 35% by weight and arsenic oxide 5% by weight melts easily to a homogeneous glass with excellent working characteristics and yields the useful optical position shown by its refractive index of 1.66 at a reciprocal relative dispersion of 49. It will further be seen that with arsenic oxide, glasses are possible between 50% and approximately 65% of zinc oxide and from approximately 1 to 15% of arsenic oxide, and the balance being boric oxide.

In its effect on refractive properties of the resultant glass the arsenic oxide differs from the phosphoric oxide in being equivalent to zinc oxide whereas the phosphoric oxide is equivalent to the boric oxide. That is, in Fig. 1, the weight of zinc oxide is the controlling factor in determining refractive index and dispersion. The relative amounts of boric oxide and phosphoric oxide have little effect on these properties. In Fig. 5 it is the weight of zinc oxide plus the weight of arsenic oxide which controls refractive index and dispersion. The substitution of arsenic oxide for boric oxide raises the refractive index but substitution of arsenic oxide for zinc oxide does not effect these properties significantly.

It has been found that one or more of the alkali oxides: potassium oxide, sodium oxide or lithium oxide, may also be included in the glass compositions given herein as modifying ingredients. In many cases their addition is undesirable as affecting the obtaining of high refractive glasses because they shift the glass forming fields to higher boric oxide content requirements and consequently lead to glasses with much lower refractive indices than those disclosed herein. However, where this lower refractive index is not undesirable, glasses containing said alkali oxides may be found to have useful properties such as ease of melting, good working properties and improved adaptability for fusing to other glasses.

A surprising discovery has been made that the transparent borate glasses containing alkali oxides can be stabilized chemically just as easily as those free from alkali and glasses of this type can be produced well within the desirable commercial limits of chemical durability.

From the foregoing description it will be seen that simple, efficient and economical means and methods have been provided for accomplishing all of the objects and advantages of the invention.

It is also apparent that lenses having more desirable characteristics than those obtained by prior art low index glasses can be obtained. For example, lenses having power simulating prior art formed of low index glass may be formed with more shallow curves with the thickness thereof greatly reduced and with less marginal distortional errors.

The optical surfaces formed on the lenses are formed by the usual prior art grinding and polishing procedure. Lenses more desirable from the opthalmic as well as the optical instrument viewpoint may be obtained.

Having described my invention, I claim:

1. A glass composition whose chemical analysis may be expressed substantially as follows:

| | Parts by weight |
|---|---|
| CdO (cadmium oxide) | Approximately 60 to 72 |
| $B_2O_3$ (boric oxide) | Approximately 18 to 35 |
| $P_2O_5$ (phosphoric oxide) | Approximately 1 to 10 | and with said oxides embodying substantially the entire composition.

2. A glass composition whose chemical analysis may be expressed substantially as follows:

| | Parts by weight |
|---|---|
| PbO (lead oxide) | Approximately 50 to 90 |
| $B_2O_3$ (boric oxide) | Approximately 50 to 10 |
| $P_2O_5$ (phosphoric oxide) | Less than 1 to 10 | and with said oxides embodying substatially the entire composition.

3. A glass composition whose chemical analysis may be expressed substantially as follows:

| | Parts by weight |
|---|---|
| BaO (barium oxide) | Approximately 40 |
| ZnO (zinc oxide) | Approximately 20 |
| $P_2O_5$ (phosphoric oxide) | Approximately 5 |
| $B_2O_3$ (boric oxide) | Approximately 35 |

4. A glass composition whose chemical analysis may be expressed substantially as follows:

| | Parts by weight |
|---|---|
| ZnO (zinc oxide) | Approximately 65 |
| $B_2O_3$ (boric oxide) | Approximately 30 |
| $P_2O_5$ (phosphoric oxide) | Approximately 5 | and with said oxides constituting the entire composition.

5. A glass composition whose chemical analysis may be expressed substantially as follows:

| | Parts by weight |
|---|---|
| CdO (cadmium oxide) | Approximately 70 |
| $B_2O_3$ (boric oxide) | Approximately 25 |
| $P_2O_5$ (phosphoric oxide) | Approximately 5 | wherein said parts constitute substantially the entire composition.

6. A glass composition whose chemical analysis may be expressed substantially as follows:

| | Parts by weight |
|---|---|
| CdO (cadmium oxide) | Approximately 60 |
| $B_2O_3$ (boric oxide) | Approximately 35 |
| $P_2O_5$ (phosphoric oxide) | Approximately 5 | wherein said parts constitute substantially the entire composition.

7. A glass composition whose chemical analysis is expressed substantially as follows:

| | Parts by weight |
|---|---|
| Phosphoric oxide ($P_2O_5$) | Approximately 1 to 20 |
| Zinc oxide (ZnO) | Approximately 50 to 70 |
| Boric oxide ($B_2O_3$) | Approximately 50 to 15 | and with said oxides embodying substantially the entire composition.

8. A glass having a relatively high index of refraction, said glass consisting by weight from about 10 percent to nearly but less than half of boric oxide, from about 1 to about 20 percent of glass vitrifying oxide selected from the group consisting of phosphoric oxide, arsenic oxide, antimony oxide, lanthanum oxide, tantalum oxide, thorium oxide and mixtures thereof, and the balance consisting of high index of refraction metal oxide selected from the group consisting of zinc oxide, cadmium oxide, lead oxide, bismuth oxide and mixtures thereof.

9. A glass as claimed in claim 8 containing an index of refraction modifying alkaline metal oxide selected from the group consisting of calcium oxide, barium oxide, strontium oxide, magnesium oxide and mixtures thereof, said alkaline metal oxide replacing partially the proportion by weight of the high index of refraction metal oxide.

10. A glass having a relatively high index of refraction, said glass consisting by weight from about 10 percent to nearly but less than half of boric oxide, from about 1 to about 20 percent of phosphoric oxide, and the balance consisting of high index of refraction metal oxide selected from the group consisting of zinc oxide, cadmium oxide, lead oxide, bismuth oxide and mixtures thereof.

11. A glass as claimed in claim 10 containing an index of refraction modifying alkaline metal oxide selected from the group consisting of calcium oxide, barium oxide, strontium oxide, magnesium oxide and mixtures thereof, said alkaline metal oxide replacing partially the proportion by weight of the high index of refraction metal oxide.

12. A glass having a relatively high index of refraction, said glass consisting by weight from about 15 percent to nearly but less than half of boric oxide, from about 1 to about 20 percent of glass vitrifying oxide selected from the group consisting of phosphoric oxide, arsenic oxide, antimony oxide, lanthanum oxide, tantalum oxide, thorium oxide and mixtures thereof, and the balance consisting of zinc oxide.

13. A glass composition consisting of:

| | Percent by weight |
|---|---|
| Zinc oxide (ZnO) | Approximately 60 |
| Calcium oxide (CaO) | Approximately 5 |
| Boric oxide ($B_2O_3$) | Approximately 30 |
| Phosphoric oxide ($P_2O_5$) | Approximately 5 |

14. A glass composition consisting of:

| | Percent by weight |
|---|---|
| Zinc oxide (ZnO) | Approximately 30 |
| Calcium oxide (CaO) | Approximately 20 |
| Boric oxide ($B_2O_3$) | Approximately 45 |
| Phosphoric oxide ($P_2O_5$) | Approximately 5 |

ALEXIS G. PINCUS.

REFERENCES CITED

The following references are of record in the file of this patent:

UNITED STATES PATENTS

| Number | Name | Date |
|---|---|---|
| 2,254,633 | Tillyer et al. | Sept. 2, 1941 |
| 2,280,322 | Tillyer | Apr. 21, 1942 |
| 2,298,746 | Moulton | Oct. 13, 1942 |
| 2,390,191 | Stanworth | Dec. 4, 1945 |

FOREIGN PATENTS

| Number | Country | Date |
|---|---|---|
| 596,471 | Germany | 1934 |